(12) United States Patent
Langbein

(10) Patent No.: US 10,967,882 B2
(45) Date of Patent: Apr. 6, 2021

(54) AUTONOMOUS VEHICLES WITH CONTROL RETAKING SYSTEMS AND METHODS OF USING SAME

(71) Applicant: MOTHERSON INNOVATIONS COMPANY LIMITED, London (GB)

(72) Inventor: Reinhold Langbein, Esslingen (DE)

(73) Assignee: Motherson Innovations Company Limited, London (GB)

( * ) Notice: Subject to any disclaimer, the term of this patent is extended or adjusted under 35 U.S.C. 154(b) by 491 days.

(21) Appl. No.: 15/865,964

(22) Filed: Jan. 9, 2018

(65) Prior Publication Data

US 2019/0210617 A1      Jul. 11, 2019

(51) Int. Cl.
| | | |
|---|---|---|
| *B60W 50/14* | (2020.01) | |
| *G06K 9/00* | (2006.01) | |
| *G05D 1/00* | (2006.01) | |
| *B60Q 1/00* | (2006.01) | |
| *B60W 50/00* | (2006.01) | |

(52) U.S. Cl.
CPC .............. *B60W 50/14* (2013.01); *B60Q 1/00* (2013.01); *G05D 1/0061* (2013.01); *G05D 1/0088* (2013.01); *G06K 9/00671* (2013.01); *G06K 9/00845* (2013.01); *B60W 2050/0072* (2013.01); *B60W 2050/146* (2013.01)

(58) Field of Classification Search
CPC ......... B60W 50/14; B60W 2050/0072; B60Q 1/00; G05D 1/00; G05D 1/0061; G05D 1/0088; G06K 9/00
USPC ......................................................... 701/23
See application file for complete search history.

(56) References Cited

U.S. PATENT DOCUMENTS

| | | | | |
|---|---|---|---|---|
| 6,496,117 | B2* | 12/2002 | Gutta ..................... | G08B 21/06 340/521 |
| 9,475,389 | B1* | 10/2016 | Fung ...................... | B60K 35/00 |
| 9,767,373 | B2* | 9/2017 | Yang .................. | G06K 9/00845 |
| 2002/0120374 | A1* | 8/2002 | Douros .................. | G07C 5/085 701/34.4 |
| 2005/0073136 | A1* | 4/2005 | Larsson ................. | A61B 5/163 280/735 |
| 2012/0271484 | A1* | 10/2012 | Feit ....................... | B60W 30/12 701/1 |
| 2014/0019005 | A1* | 1/2014 | Lee ....................... | G08G 1/0962 701/36 |
| 2015/0012186 | A1* | 1/2015 | Horseman ............. | A61B 5/1114 701/49 |
| 2015/0109429 | A1* | 4/2015 | Inoue .................. | G06K 9/00845 348/78 |
| 2016/0068103 | A1* | 3/2016 | McNew ................ | B60W 50/14 701/23 |
| 2016/0090043 | A1* | 3/2016 | Kim ....................... | B60R 1/025 701/49 |

(Continued)

*Primary Examiner* — Tan Q Nguyen
(74) *Attorney, Agent, or Firm* — Jones Day

(57) ABSTRACT

An autonomous vehicle system, and a method of using same, includes an eye or face tracking sensor for tracking a user's movements or expressions, a head up display for displaying information to the user, an instrument cluster for providing driving measurements of the autonomous vehicle, a time of flight sensor, a camera monitor system for displaying a side or rear view of the vehicle, and a control unit to communicate with the eye or face tracking sensor, the head up display, the time of flight sensor, and the camera monitor system when receiving a request to turn over driving controls to the user.

18 Claims, 8 Drawing Sheets

(56) References Cited

U.S. PATENT DOCUMENTS

| | | | |
|---|---|---|---|
| 2016/0114728 A1* | 4/2016 | Tan ........................... | B60R 1/00 348/148 |
| 2017/0046578 A1* | 2/2017 | Phillips .............. | H04N 5/23293 |
| 2017/0235305 A1* | 8/2017 | Jung .................. | B60W 50/082 701/23 |
| 2018/0302556 A1* | 10/2018 | Baran .................. | H04N 5/2258 |

* cited by examiner

AUTONOMOUS VEHICLES WITH CONTROL RETAKING SYSTEMS AND METHODS OF USING SAME

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

1. Field of the Invention

The following description relates to autonomous vehicle systems and methods of retaking control of the vehicle by a user using same. For example, during use of an autonomous vehicle, a transition from automated driving to manual or assisted-only driving may be desired depending on one or more circumstances. An autonomous vehicle may assess the user's fitness for driving prior to handing control back to the user.

2. Description of Related Art

Automated driving and the use of autonomous vehicles has become more technically feasible and common. The most important and frequently investigated challenge is the transition from automated driving to manual or assisted-only driving. For such transitions, the vehicle must quickly hand over control and assess the fitness of the user for handling the driving. Further, in the event of a potentially dangerous situation that is too complex to be handled by the computers, the software, or automated driving, the vehicle must very quickly assess the user's fitness and hand back manual or assisted control.

According to recent studies and referring to FIG. 1, the rate of so-called autonomous vehicle "disengagements" has dropped from 0.8 disengagements per 1,000 miles in 2015 to 0.2 disengagements per 1,000 miles in 2016 (Waymo report). Other studies report significantly higher rates. The definition of disengagement may vary according to the particular study; the department of motor vehicles ("DMV") defines disengagements as deactivations of the autonomous mode in two situations: (1) when a failure of the autonomous technology is detected; or (2) when the safe operation of the vehicle requires that the autonomous vehicle test driver disengage the autonomous mode and take immediate manual control of the vehicle.

Typical systems and methods for handing back control of autonomous vehicles include audio and visual systems where a sound or visual alert is initiated so that the driver is signaled to retake control. However, such systems are insufficient at least because they fail to ensure the fitness of the driver and the safety of handing back control to the driver in a particular situation prior to handing back control. In addition, other systems merely describe the selection of a driving mode as in United States Patent Application Publication No. 2017/0329331.

Referring to Table 1 below, example causes for disengagements include for weather conditions, reckless behaving road users, unwanted maneuver of the vehicle, perception discrepancy, incorrect behavior prediction of other traffic participants, software discrepancies, constructions zones, emergency vehicles, and debris in the roadway, among others.

TABLE 1

| CAUSE | Disengagements by Cause | | | | | | | | | | | | |
|---|---|---|---|---|---|---|---|---|---|---|---|---|---|
| | December 2015 | January 2016 | February 2016 | March 2016 | April 2016 | May 2016 | June 2016 | July 2016 | August 2016 | September 2016 | October 2016 | November 2016 | Total |
| disengage for weather conditions during testing | 1 | 0 | 0 | 0 | 0 | 0 | 0 | 0 | 0 | 0 | 0 | 0 | 1 |
| disengage for a recklessly behaving road user | 0 | 0 | 1 | 0 | 0 | 1 | 2 | 0 | 2 | 1 | 2 | 1 | 10 |
| disengage for unwanted maneuver of vehicle | 0 | 2 | 4 | 0 | 2 | 2 | 2 | 10 | 5 | 1 | 2 | 0 | 30 |
| disengage for a perception discrepancy | 0 | 3 | 1 | 1 | 1 | 2 | 2 | 3 | 1 | 2 | 2 | 2 | 20 |
| disengage for incorrect behavior prediction of other traffic participant | 0 | 1 | 0 | 0 | 0 | 1 | 0 | 1 | 1 | 0 | 1 | 1 | 6 |
| disengage for a software discrepancy | 1 | 0 | 1 | 4 | 3 | 4 | 2 | 8 | 8 | 7 | 8 | 5 | 51 |
| disengage for construction zone during testing | 0 | 0 | 0 | 0 | 0 | 0 | 1 | 0 | 0 | 1 | 0 | 0 | 2 |
| disengage for emergency vehicle during testing | 0 | 0 | 0 | 2 | 0 | 0 | 0 | 0 | 0 | 0 | 0 | 0 | 2 |
| disengage for debris in the roadway | 0 | 0 | 0 | 0 | 0 | 0 | 0 | 2 | 0 | 0 | 0 | 0 | 2 |
| Total | 2 | 6 | 7 | 7 | 6 | 10 | 9 | 24 | 17 | 12 | 15 | 9 | 124 |

SUMMARY

In an aspect, an autonomous vehicle system includes an eye or face tracking sensor for tracking a user's movements or expressions, a head up display for displaying information to the user, an instrument cluster for providing driving measurements of the autonomous vehicle, a time of flight sensor, a camera monitor system for displaying a side or rear view of the vehicle, and a control unit to communicate with the eye or face tracking sensor, the head up display, the time of flight sensor, and the camera monitor system when receiving a request to turn over driving controls to the user.

In response to receiving a request to turn over driving controls to the user, the control unit may activate an indicator requiring the user to look towards a predetermined position.

The predetermined position may be a position on at least one of the head up display, the instrument cluster, the camera monitor system, and an exterior or interior mirror.

The eye or face tracking sensor may track the user's movement or position to confirm that the user is looking towards the predetermined position.

The eye or face tracking sensor may track a change in the user's expression to confirm that the user is aware of a surrounding circumstance.

In response to detecting a bad weather condition, the control unit may activate an indicator requiring the user to look first towards the head up display and then towards the camera monitor system or the instrument cluster.

The camera monitor system may include a left camera monitor system and a right camera monitor system, and in response to detecting a reckless driving vehicle, the control unit may activate an indicator requiring the user to look first towards one of the left or right camera monitor systems and then towards the instrument cluster or the other of the left or right camera monitor systems.

In response to detecting an unexpected or unpredicted maneuver from another vehicle, the control unit may activate an indicator requiring the user to look first towards the instrument cluster and then towards the camera monitor system.

In response to detecting a software malfunction, the control unit may activate an indicator requiring the user to look first towards the instrument cluster and then towards the head up display and the camera monitor system in no specific order.

In response to detecting an obstacle in a driving path, the control unit may activate an indicator requiring the user to look first towards the head up display and then towards the instrument cluster and then towards the camera monitor system.

In another aspect, a method of handing driving control to a user using an autonomous vehicle system includes detecting a condition in which it is preferred that the user have driving control, receiving, using a control unit, a signal indicating that the detected condition has been detected, initiating a hand-control-to-user protocol in response to receiving the signal comprising communicating, using the control unit, with at least one of an eye or face tracking sensor, a head up display, a time of flight sensor, and a camera monitor system, and handing driving control to the user upon successful completion of the hand-control-to-user protocol.

The hand-control-to-user protocol may further include activating an indicator requiring the user to look towards a predetermined position.

The predetermined position may be a position on at least one of the head up display, the instrument cluster, the camera monitor system, and an exterior or interior mirror.

The hand-control-to-user protocol may further include tracking, using the eye or face tracking sensor, the user's movement or position to confirm that the user is looking towards the predetermined position.

The hand-control-to-user protocol may further include tracking, using the eye or face tracking sensor, a change in the user's expression to confirm that the user is aware of the detected condition.

The hand-control-to-user protocol may further include activating an indicator requiring the user to look first towards the head up display and then towards the camera monitor system or the instrument cluster in response to detecting a bad weather condition, and detecting that the user actually looked at the indicator using the eye or face tracking sensor.

The hand-control-to-user protocol may further include activating an indicator requiring the user to look first towards a left or right camera monitor system and then towards the instrument cluster or the other of the left or right camera monitor system in response to detecting a reckless driving vehicle, and detecting that the user actually looked at the indicator using the eye or face tracking sensor.

The hand-control-to-user protocol may further include activating an indicator requiring the user to look first towards the instrument cluster and then towards the camera monitor system in response to detecting an unexpected or unpredicted maneuver from another vehicle, and detecting that the user actually looked at the indicator using the eye or face tracking sensor.

The hand-control-to-user protocol may further include activating an indicator requiring the user to look first towards the instrument cluster and then towards the head up display and the camera monitor system in no specific order in response to detecting a software malfunction, and detecting that the user actually looked at the indicator using the eye or face tracking sensor.

The hand-control-to-user protocol may further include activating an indicator requiring the user to look first towards the head up display and then towards the instrument cluster and then towards the camera monitor system in response to detecting an obstacle in a driving path, and detecting that the user actually looked at the indicator using the eye or face tracking sensor.

BRIEF DESCRIPTION OF THE SEVERAL VIEWS OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention.

DETAILED DESCRIPTION OF THE INVENTION

Figure 1:
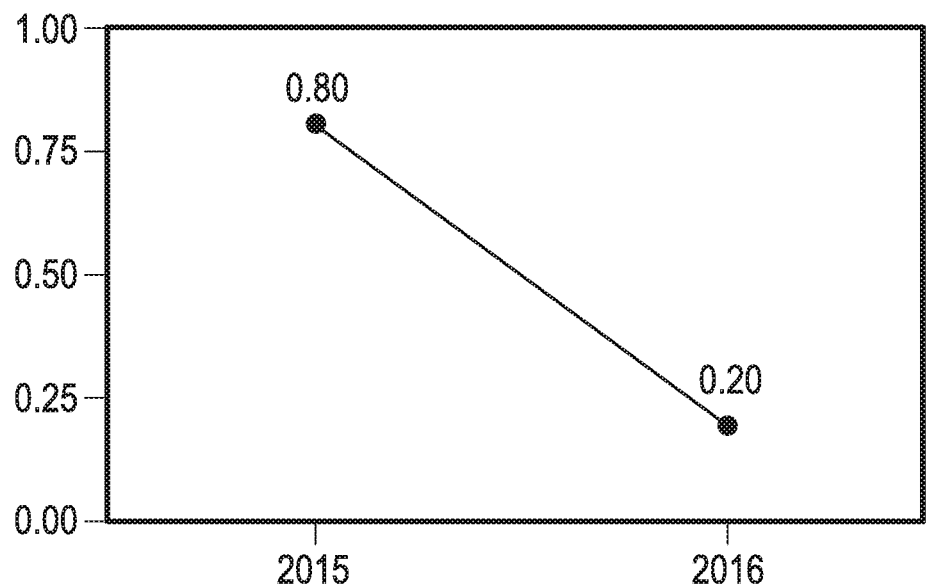
FIG. 1 is a diagram illustrating the rate of autonomous vehicle disengagements per 1,000 miles from 2015 to 2016 according to a study.

Before explaining at least one embodiment of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation—specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

Figure 2:
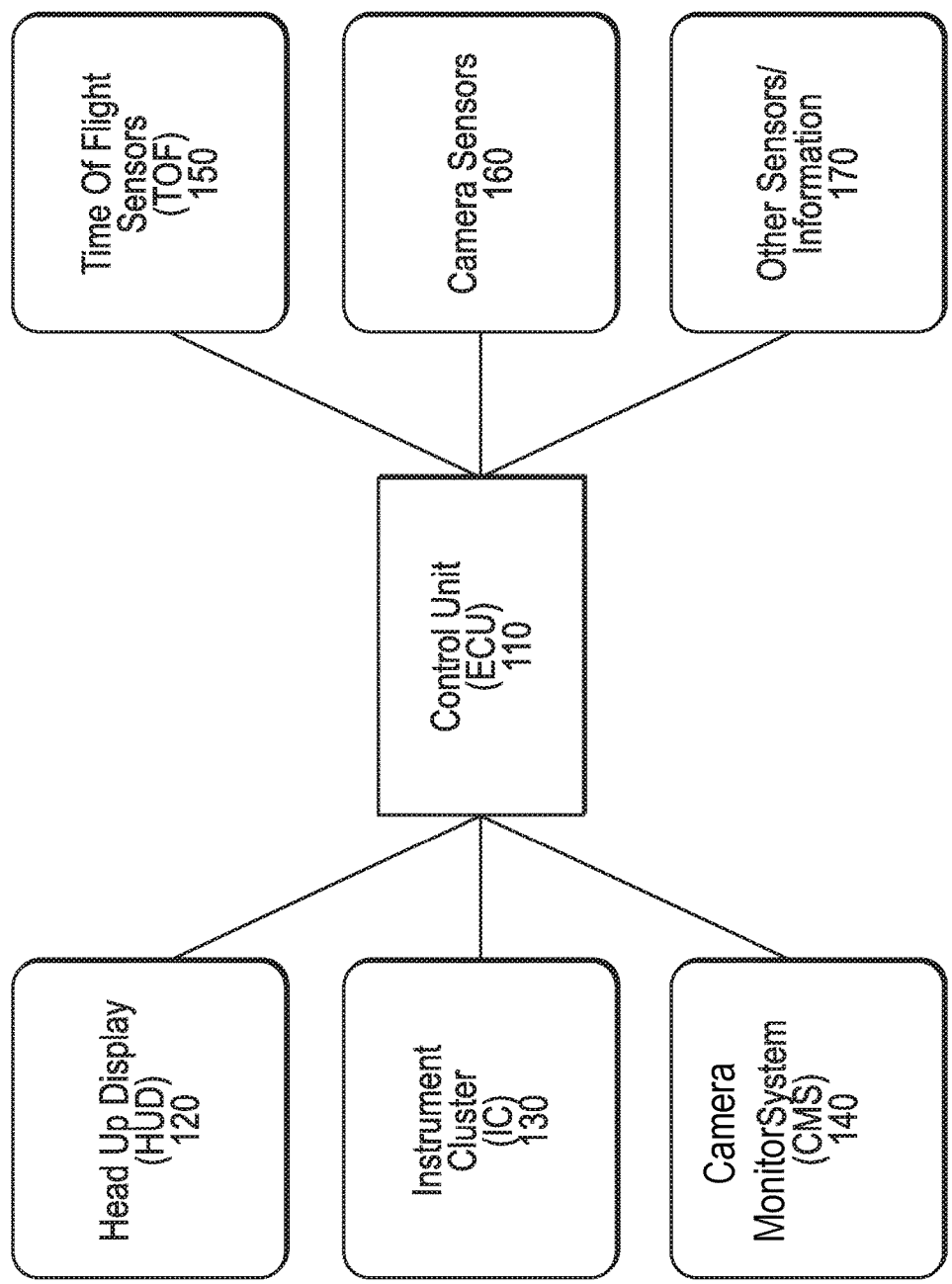
FIG. 2 is a diagram illustrating the control and sensor systems of an autonomous vehicle according to an example of the invention.

Referring to FIG. 2 by way of non-limiting example, and consistent with examples of the invention, an autonomous vehicle system 100 includes a Driving Safety Control Unit (hereinafter "ECU") 110, a Head Up Display data receiver/transmitter (hereinafter "HUD unit") 120, an Instrument Cluster data receiver/transmitter (hereinafter "IC unit") 130, a Camera Monitor System data receiver/transmitter (hereinafter "CMS unit") 140, a Time Of Flight Sensor data receiver/transmitter (hereinafter "TOF unit") 150, a Camera Sensor data receiver/transmitter 160, and other data transmitting/receiving units 170.

While only one of each unit is displayed and described, it should be appreciated to a person having ordinary skill in the art that one or more units for each may be used such as one or more TOF units or one or more Camera Sensor units. Where more than one unit is used, all units may be connected to a single data receiver/transmitter or may receive and transmit data separately using individual data receivers/transmitters. It should be appreciated that while communication with the ECU is described as preferably two-way communication, communication may also be one-way from the ECU to the unit or vice versa. In addition, individual units may communicate with one another. For example, two Camera Sensor units may communicate with one another, and all units may communicate with one another such as the HUD unit communicating with the IC unit.

Still referring to FIG. 2, all units may already be units equipped in an autonomous vehicle and used for other applications. In an example, the HUD unit 120 is related to an interactive display on the windshield of the vehicle, the IC unit 130 is related to an internal console display within the vehicle which displays speed, acceleration, and other vehicle related gauges, the CMS unit 140 is related to one or more rearview or sideview display devices, the TOF Sensors 150 and Camera Sensors 160 are related to sensors used for vehicle operations, and the vehicle may already be equipped with other sensors 170 and systems which are capable of communicating with the ECU 110.

Figure 3:
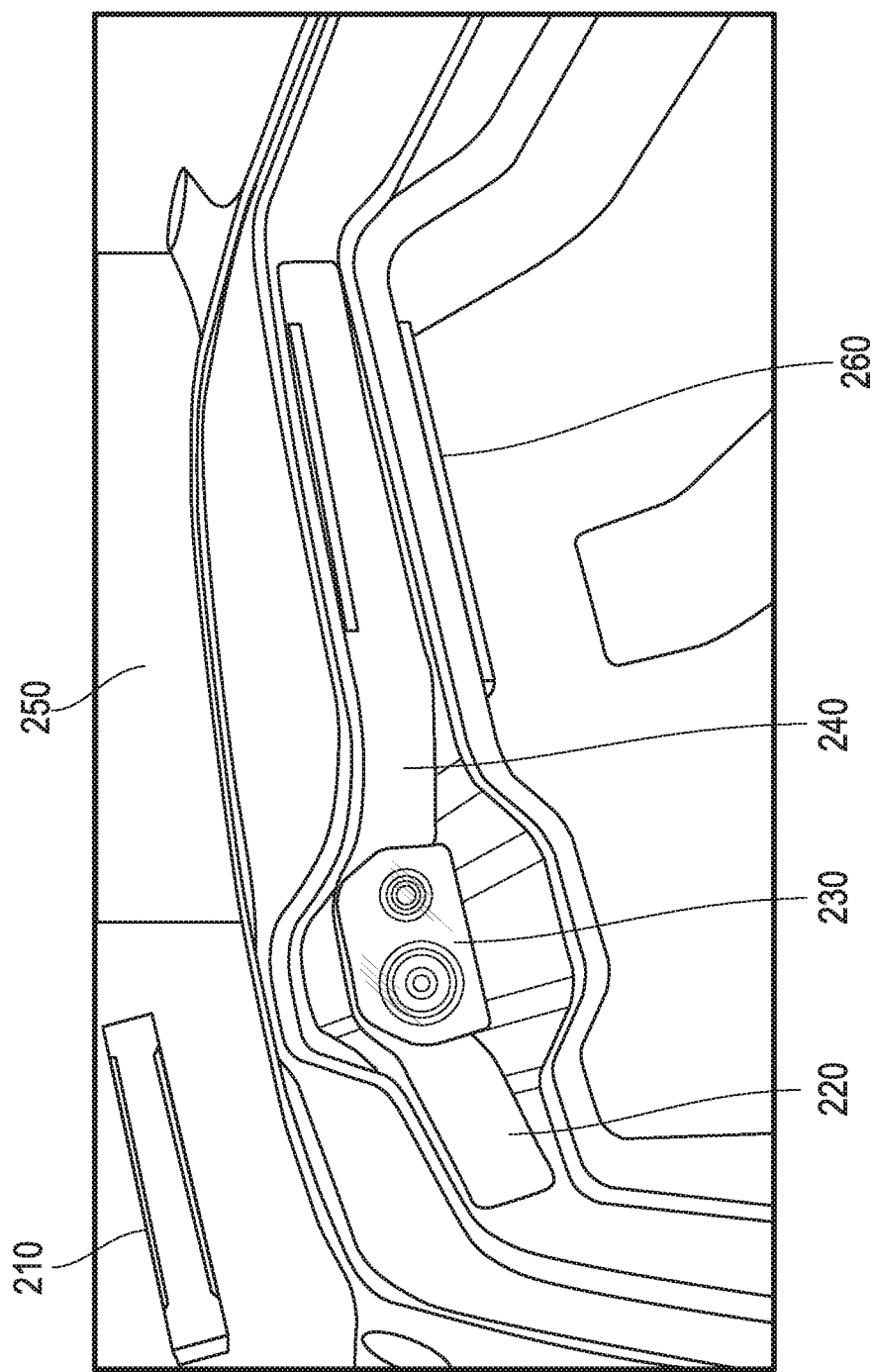
FIG. 3 is a diagram illustrating an interior of an autonomous vehicle including the vehicle dashboard and other systems according to an example of the invention.

FIG. 3 is a diagram illustrating an interior of an autonomous vehicle including the vehicle dashboard and other systems according to an example of the invention.

Referring to FIG. 3, the interior 200 of an autonomous vehicle may include eye and face tracking sensor(s) 210, a left CMS display 220, a right CMS display 240, an IC display 230, a HUD 250, and TOF sensor(s) 260. The ECU 100 may receive a request to return the user to his driving tasks, then run several operations and checks to verify if the user is fit enough and familiar with the driving situation. This may be accomplished through communications between the ECU and the communication units of such described systems.

For example, the user may receive instructions by the autonomous vehicle to check all or at least one of: left and right CMS display 220, 240, an interior mirror or camera system or display, speed or status of ADAS on the IC display 230, current trajectory and driving conditions in front of the vehicle as animated by the HUD 250, and other information such as information coming from V2X communication systems.

In an example, a number of different protocols may be initiated where the user is signaled to look at a particular display or unit by an animation such as a spot being displayed or arrows that point to the direction which the user is being instructed to look. The gaze of the driver may be monitored by the installed sensors and systems, and the spot may fade away and move to the next position when it is determined by the ECU 100 that the driver has seen enough information. In some examples, the autonomous vehicle may also include physiological sensors to detect the condition of a user such as Electroencephalogram (EEG) sensors for detecting the brain activities of the user. As such, the vehicle may obtain additional data regarding whether the driver has understood the relevant situation and is aware of driving conditions.

The sequence of checks and the order in which the system instructs the user to check different units or displays may vary according to the driving situation and/or the perceived danger. In addition, the time period for which a user is required to view a certain unit or display may vary in order to shorten the time for teaching the most immediate danger to the user. In response to the system confirming that the user is in control of the situation, the automatic driving system may switch off entirely or transition to assist-only mode in order to allow the driver to control the dangerous situation until reactivated. In some examples, the system may randomly and routinely initiate training modes or fire drills in which the driver is tested of dangerous situations. Accordingly, the driver is made aware and accustomed to the potential need for having to take over control of the vehicle.

Example 1—Weather Conditions

Figure 4:
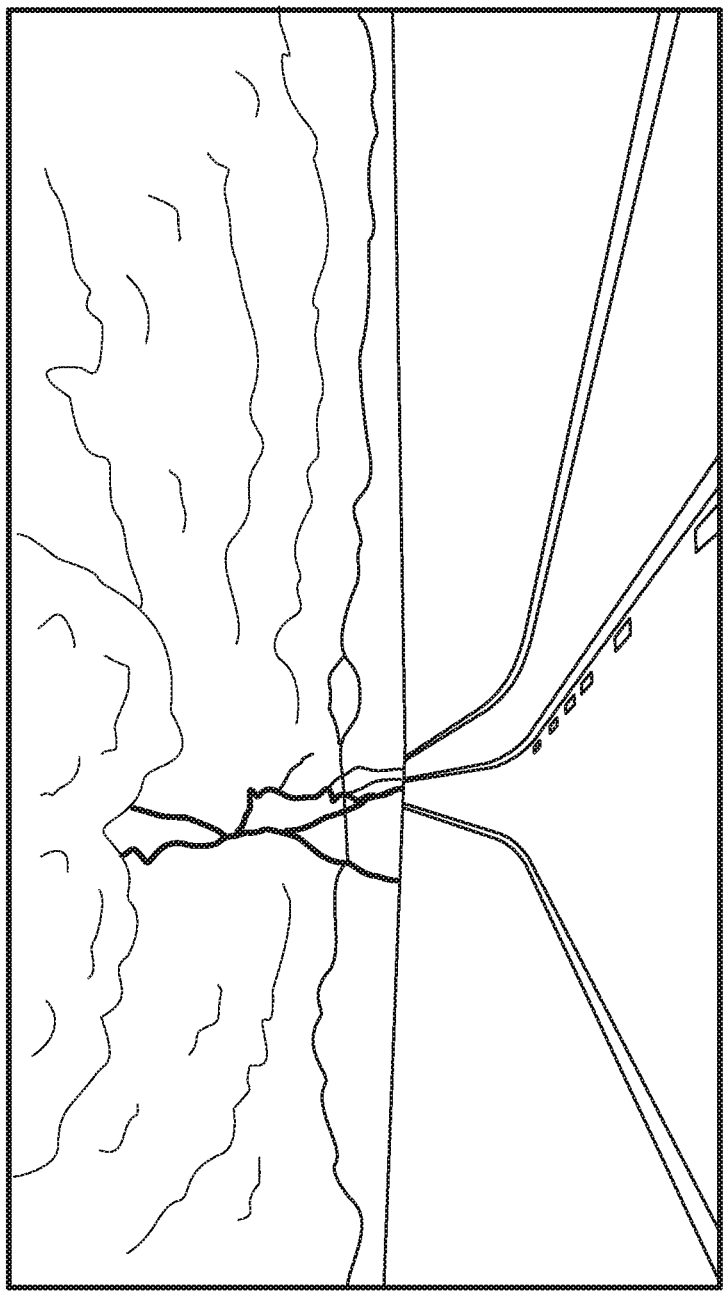
FIG. 4 is a diagram illustrating an example of a situation which may occur and be detected prior to an autonomous vehicle initiating the return control to user protocol.

FIG. 4 is a diagram illustrating an example of a situation which may occur and be detected prior to an autonomous vehicle initiating the return control to user protocol.

Referring to FIG. 4 and FIG. 3 together, in response to a vehicle in autonomous driving mode detecting bad weather conditions using one or more on-board sensors (camera, lidar, radar) or through car-to-x communication, the vehicle may initiate a return control to user protocol. In this example, the protocol may require the driver to first look towards the road and location of the weather condition as marked using the HUD 250. One or more sensors may detect that the user is properly facing the marked position on the HUD 250. The eye and face tracking sensor 210 may follow and detect the gaze of the user. An expression of the user may be registered by the eye and face tracking sensor 210 to detect whether the user is aware of the imminent danger. Subsequently, other data may be detected by additional units of the vehicle such as the left/right CMS display 220, 240 and the IC display 230 to confirm that the user is fully prepared to take over control of the vehicle.

Example 2—Reckless Drivers

Figure 5:
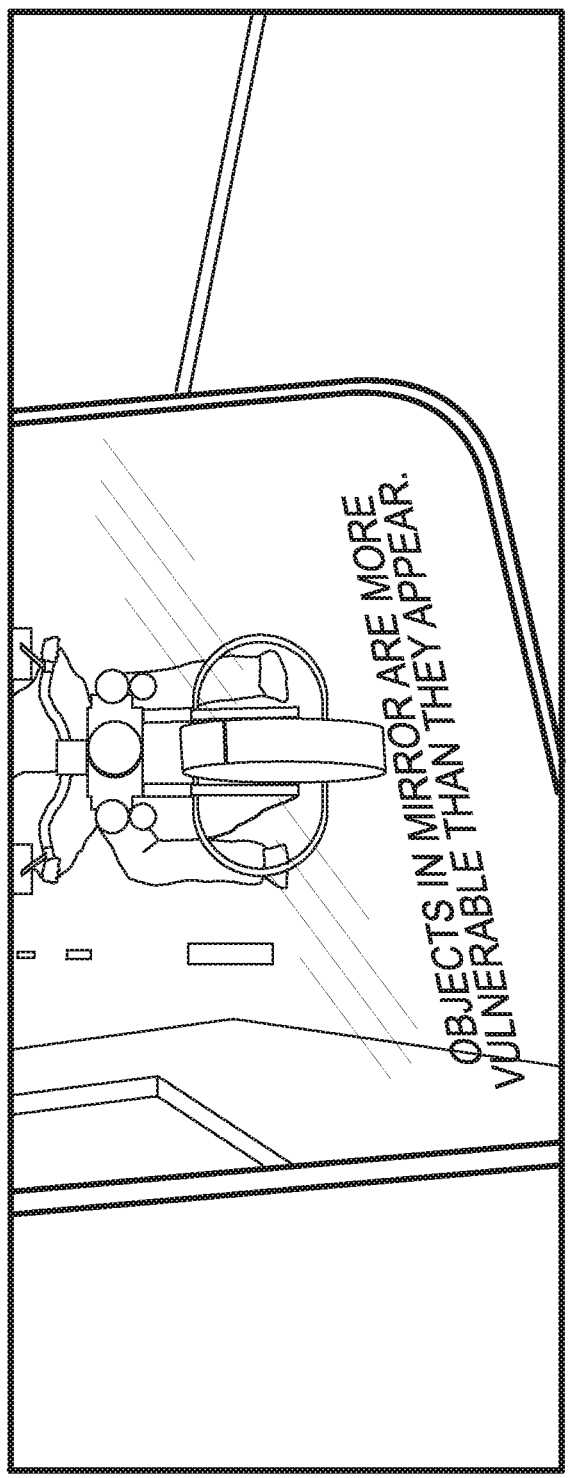
FIG. 5 is a diagram illustrating another example of a situation which may occur and be detected prior to an autonomous vehicle initiating the return control to user protocol.

FIG. 5 is a diagram illustrating another example of a situation which may occur and be detected prior to an autonomous vehicle initiating the return control to user protocol.

Referring to FIG. 5 and FIG. 3 together, in response to the autonomous vehicle detecting a reckless driving vehicle such as a motorcycle approaching the vehicle too closely for safe automated driving, the vehicle may initiate the return control to user protocol. In this example, the protocol may require the driver to first look at the right CMS display 240. The eye and face tracking sensor 210 may register if the driver complies and is aware of the danger. Subsequently, the driver may be directed to view the speedometer of the IC display 230 to learn the speed and assess the possibility to brake or swerve. Next, the driver may be directed to look at the left CMS display 220 to determine whether it is possible to move left and avoid the dangerous condition previously detected at the right of the vehicle.

Example 3—Incorrect Behavior Prediction of Other Travel Participants

Figure 6:
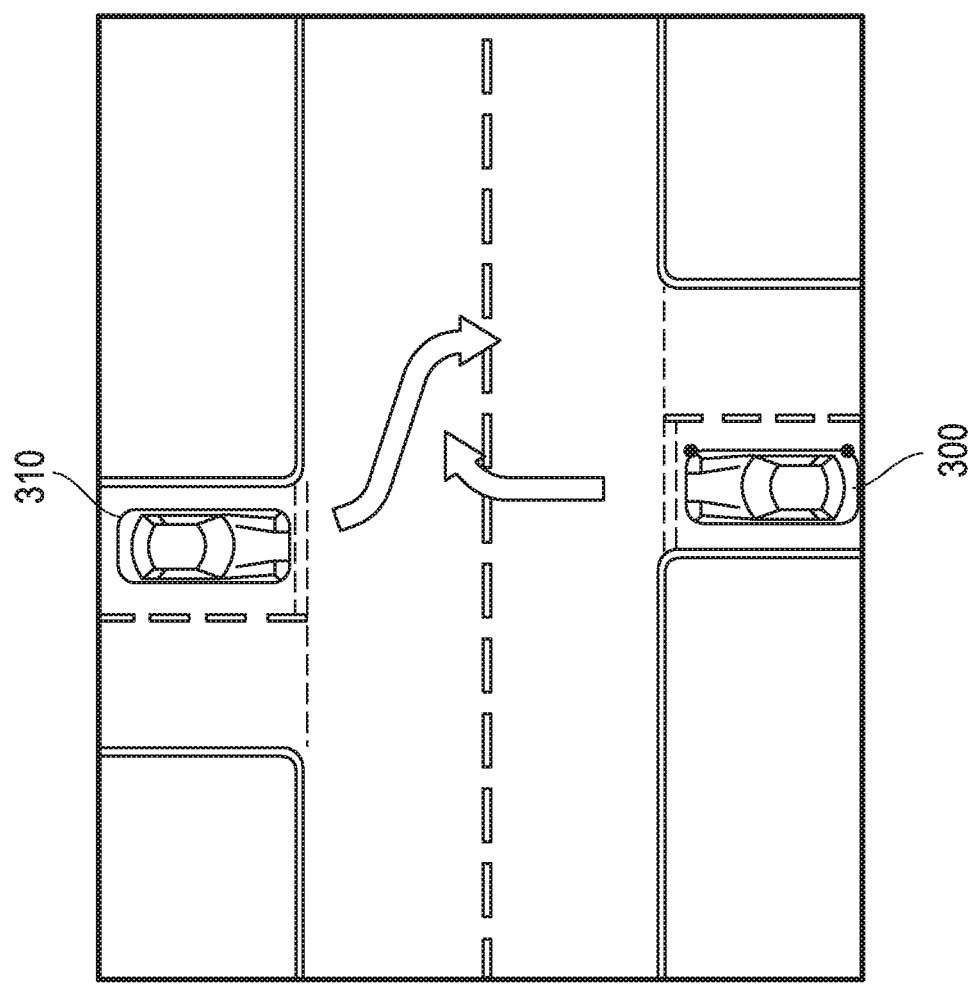
FIG. 6 is a diagram illustrating an additional example of a situation which may occur and be detected prior to an autonomous vehicle initiating the return control to user protocol.

FIG. 6 is a diagram illustrating an additional example of a situation which may occur and be detected prior to an autonomous vehicle initiating the return control to user protocol.

Referring to FIG. 6 and FIG. 3 together, in response to the autonomous vehicle 300 detecting a strange or unexpected maneuver from another vehicle 310, the autonomous vehicle may initiate the return control to user protocol. In this example, it is most important for the driver to check his own speed first and to estimate the distance to the oncoming car. Accordingly, the driver may be direct to first view the speedometer of the IC display 230 and then view the left/right CMS display 220, 240 in order to receive the information to make a decision on how to respond. For example, the driver may determine that the it safer to brake or swerve to avoid the potential collision. The eye and face tracking sensor 210 may monitor the proper sequence to determine if the driver is in control of the situation.

Example 4—Software Malfunction

Figure 7:
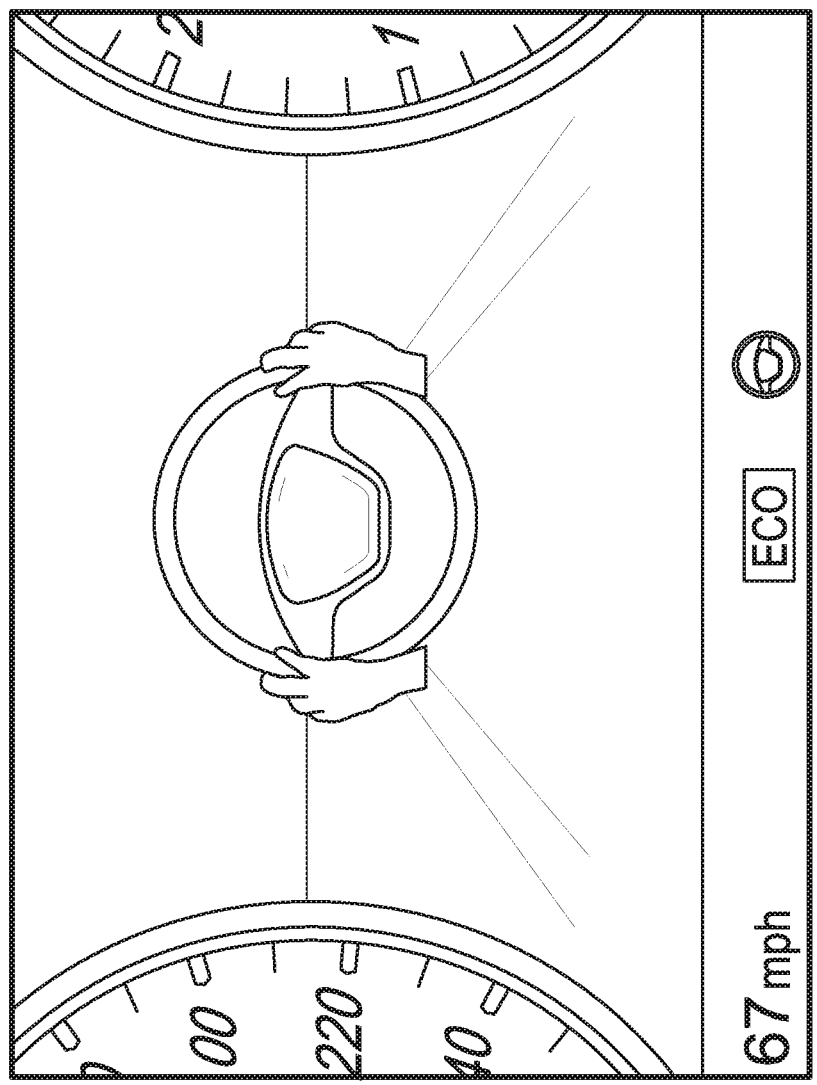
FIG. 7 is a diagram illustrating a further example of a situation which may occur and be detected prior to an autonomous vehicle initiating the return control to user protocol

FIG. 7 is a diagram illustrating a further example of a situation which may occur and be detected prior to an autonomous vehicle initiating the return control to user protocol.

Referring to FIG. 7 and FIG. 3 together, in response to the vehicle reporting or detecting a problem with the software or sensors which would require control by the user, the return control to user protocol may be initiated. In this example, the driver is first directed to view the IC display 230 to check the speed and nature of the problem. For example, whether the problem is a software problem, a sensor problem, or any other vehicle problem. Next, the user may be directed to look through all displays and mirrors and the front windshield. In some examples, no specific sequence is required to be followed by the driver after viewing the IC display 230 because the nature of the problem is not related to external traffic conditions but internal software conditions. Thus, the driver likely has reasonable time and there is no immediate threat posed. The eye and face tracking sensor 210 may ensure that all required units have been checked and the driver is in control of the situation.

Example 5—Obstacles in Driving Path

Figure 8:
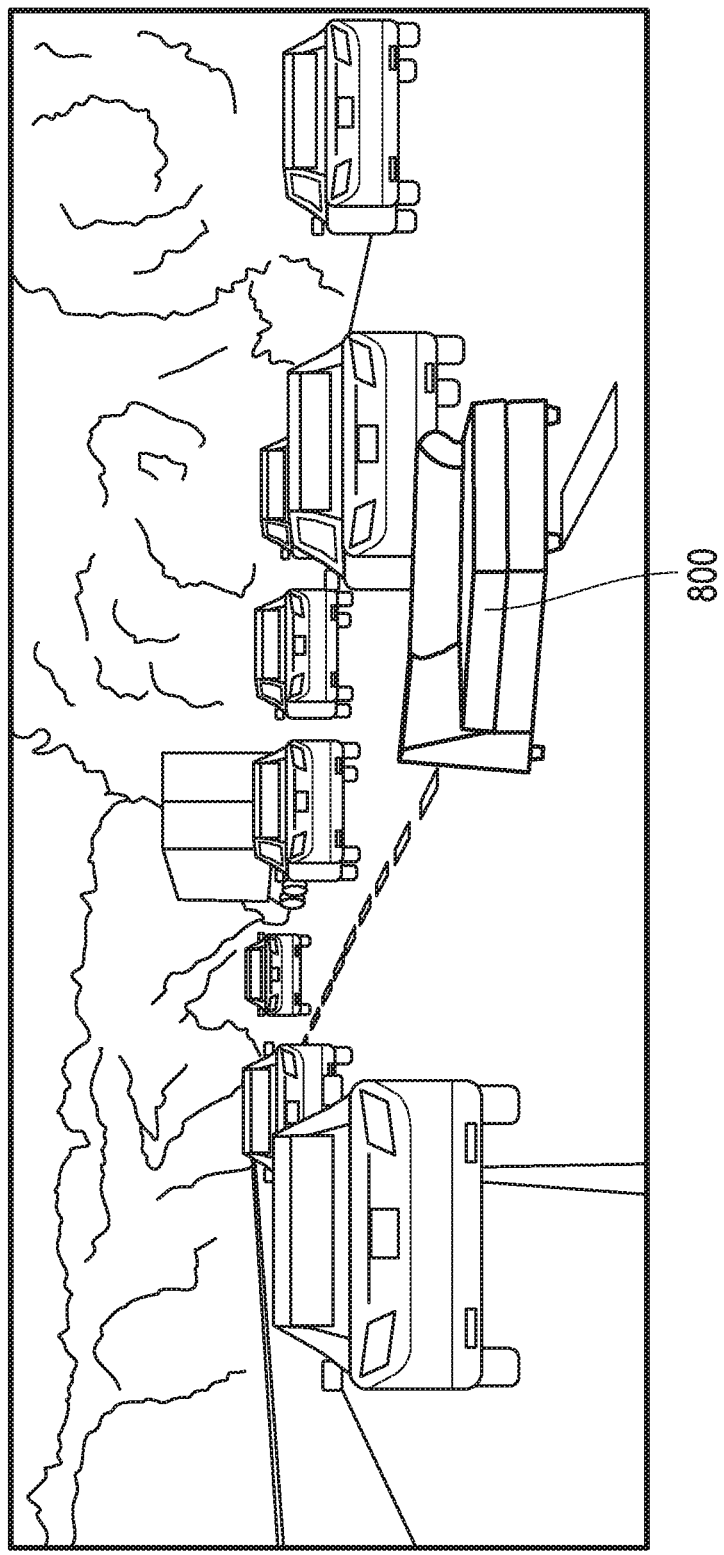
FIG. 8 is a diagram illustrating yet another example of a situation which may occur and be detected prior to an autonomous vehicle initiating the return control to user protocol.

FIG. 8 is a diagram illustrating yet another example of a situation which may occur and be detected prior to an autonomous vehicle initiating the return control to user protocol.

Referring to FIG. 8 and FIG. 3 together, in response to the autonomous vehicle sensors detecting unexpected obstacles or dangers on the road which may be better handled by the driver, the return control to user protocol may be initiated. While such scenarios may be reduced by car2x communication, a sensor may not be able to detect the actual level of danger and there may be need to return control to the user.

In this example, it is most important for the driver to see the obstacle and determine its nature. Thus, the user may be directed to view the HUD 250, and the HUD 250 may point to the obstacle and display the measured distance to the obstacle. Next, the user may be directed to view the IC display 230 to determine a speed of the vehicle. In some examples, the speed of the vehicle and level of danger may separately also be displayed on the HUD 250 in response to detecting an obstacle making easier for the user to gather all necessary information. This will support the user in deciding whether breaking, slowing down, or swerving may be the best response to the oncoming obstacles. Subsequently, the user may be guided to view the left/right CMS displays 220, 240 to determine the possibility of avoiding the object. The eye and face tracking sensor 210 may ensure that all required units have been checked and the driver is in control of the situation.

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

What is claimed is:

1. An autonomous vehicle system of a vehicle, comprising:
   an eye or face tracking sensor for tracking a user's movements or expressions;
   a display for displaying information to the user;
   a rear view system for displaying a side or rear view of the vehicle; and
   a control unit configured to communicate with the eye or face tracking sensor to detect a user's awareness and transfer control of the vehicle to the user using the detected awareness,
   wherein, in response to receiving a request to turn over driving controls to the user, the control unit is configured to activate an indicator requiring the user to look towards a predetermined position on the rear view system.

2. The autonomous vehicle system of claim 1, wherein the eye or face tracking sensor tracks the user's movement or position to confirm that the user is looking towards the predetermined position.

3. The autonomous vehicle system of claim 1, wherein the eye or face tracking sensor tracks a change in the user's expression to confirm that the user is aware of a surrounding circumstance.

4. The autonomous vehicle system of claim 1, wherein in response to detecting a bad weather condition, the control unit is configured to activate an indicator requiring the user to look first towards the display and then towards the rear view system.

5. The autonomous vehicle system of claim 1, wherein the rear view system comprises a left rear view system and a right rear view system, and in response to detecting a reckless driving vehicle, the control unit is configured to activate an indicator requiring the user to look first towards one of the left or right rear view systems and then towards the display or the other of the left or right rear view systems.

6. The autonomous vehicle system of claim 1, wherein in response to detecting an unexpected or unpredicted maneuver from another vehicle, the control unit is configured to activate an indicator requiring the user to look first towards the display and then towards the rear view system.

7. The autonomous vehicle system of claim 1, wherein the display comprises a head up display and an instrument cluster, and in response to detecting a software malfunction, the control unit is configured to activate an indicator requiring the user to look first towards the instrument cluster and then towards the rear view system and the head up display in no specific order.

8. The autonomous vehicle system of claim 1, wherein the display comprises a head up display and an instrument cluster, and in response to detecting an obstacle in a driving path, the control unit is configured to activate an indicator requiring the user to look first towards the head up display and then towards the instrument cluster and then towards the rear view system.

9. The autonomous vehicle system of claim 1, further comprising a time of flight sensor, wherein the display comprises at least one of head up display and an instrument cluster, and the rear view system comprises at least one of a camera monitor system and a mirror.

10. A method of handing driving control to a user using an autonomous vehicle system, comprising:
    detecting a condition in which it is preferred that the user have driving control;
    receiving, using a control unit, a signal indicating that the detected condition has been detected;
    initiating a hand-control-to-user protocol in response to receiving the signal wherein the hand-control-to-user protocol comprises,
    activating an indicator requiring the user to look towards a predetermined position on a rear view system for displaying a side or rear view of the vehicle, and
    detecting, using an eye or face tracking sensor, that the user is looking towards the predetermined position on the rear view system; and
    handing driving control to the user upon successful completion of the hand-control-to-user protocol.

11. The method of claim 10, wherein the hand-control-to-user protocol further comprises tracking, using an eye or face tracking sensor, the user's movement or position to confirm that the user is looking towards the predetermined position.

12. The method of claim 10, wherein the hand-control-to-user protocol further comprises tracking, using an eye or face tracking sensor, a change in the user's expression to confirm that the user is aware of the detected condition.

13. The method of claim 10, wherein the hand-control-to-user protocol further comprises activating an indicator requiring the user to look first towards a head up display and then towards a camera monitor system or an instrument cluster in response to detecting a bad weather condition, and detecting that the user actually looked at the indicator using an eye or face tracking sensor.

14. The method of claim 10, wherein the hand-control-to-user protocol further comprises activating an indicator requiring the user to look first towards a left or right camera monitor system and then towards an instrument cluster or the other of the left or right camera monitor system in response to detecting a reckless driving vehicle, and detecting that the user actually looked at the indicator using an eye or face tracking sensor.

15. The method of claim 10, wherein the hand-control-to-user protocol further comprises activating an indicator requiring the user to look first towards an instrument cluster and then towards a camera monitor system in response to detecting an unexpected or unpredicted maneuver from another vehicle, and detecting that the user actually looked at the indicator using the eye or face tracking sensor.

16. The method of claim 10, wherein the hand-control-to-user protocol further comprises activating an indicator requiring the user to look first towards an instrument cluster and then towards a head up display and a camera monitor system in no specific order in response to detecting a software malfunction, and detecting that the user actually looked at the indicator using an eye or face tracking sensor.

17. The method of claim 10, wherein the hand-control-to-user protocol further comprises activating an indicator requiring the user to look first towards a head up display and then towards an instrument cluster and then towards a camera monitor system in response to detecting an obstacle in a driving path, and detecting that the user actually looked at the indicator using an eye or face tracking sensor.

18. The method of claim 10, further comprising communicating, using the control unit, with at least one of an eye or face tracking sensor, a head up display, a time of flight sensor, a camera monitor system, and a mirror.

* * * * *